(12) United States Patent
Srinivasaraghavan et al.

(10) Patent No.: US 9,037,618 B2
(45) Date of Patent: May 19, 2015

(54) DISTRIBUTED, UNIFIED FILE SYSTEM OPERATIONS

(75) Inventors: Haripriya Srinivasaraghavan, Bangalore (IN); Vijai Babu Madhavan, Bangalore (IN)

(73) Assignee: Novell, Inc., Provo, UT (US)

( * ) Notice: Subject to any disclaimer, the term of this patent is extended or adjusted under 35 U.S.C. 154(b) by 150 days.

(21) Appl. No.: 13/077,248

(22) Filed: Mar. 31, 2011

(65) Prior Publication Data

US 2012/0254140 A1 Oct. 4, 2012

(51) Int. Cl.
*G06F 7/00* (2006.01)
*G06F 17/30* (2006.01)
*G06F 11/14* (2006.01)

(52) U.S. Cl.
CPC .... *G06F 17/30215* (2013.01); *G06F 17/30949* (2013.01); *G06F 11/1435* (2013.01)

(58) Field of Classification Search
CPC .................................................. G06F 17/30949
USPC ......................................................... 707/822
See application file for complete search history.

(56) References Cited

U.S. PATENT DOCUMENTS

| | | | |
|---|---|---|---|
| 6,546,391 B1 | 4/2003 | Tsuruoka | |
| 7,587,426 B2 | 9/2009 | Fujiwara et al. | |
| 8,473,444 B1 * | 6/2013 | McCarten | 706/47 |
| 2004/0030731 A1 | 2/2004 | Iftode et al. | |
| 2004/0205152 A1 * | 10/2004 | Yasuda et al. | 709/217 |
| 2005/0120025 A1 * | 6/2005 | Rodriguez et al. | 707/10 |
| 2009/0271418 A1 | 10/2009 | Vaghani et al. | |
| 2010/0293338 A1 * | 11/2010 | Krishnaprasad et al. | 711/136 |
| 2011/0126192 A1 * | 5/2011 | Frost et al. | 717/178 |

FOREIGN PATENT DOCUMENTS

WO WO-0237224 A2 5/2002

* cited by examiner

*Primary Examiner* — Ajith Jacob
(74) *Attorney, Agent, or Firm* — Schwegman Lundberg & Woessner, P.A.

(57) ABSTRACT

Apparatus, systems, and methods may operate to receive a request to access a file from a client node at one of a plurality of lookup nodes, the lookup nodes storing portions of a distributed table having lookup information associated with the file. The distributed table, which may comprise a distributed hash table, includes replicated references to virtualized and non-virtualized file elements of varied granularity in a unified file system. Additional activity may comprise forwarding the request to another one of the lookup nodes until the lookup information is located, or chaining the request to one of the plurality of lookup nodes and implementing activity that has been requested. Additional apparatus, systems, and methods are disclosed.

19 Claims, 4 Drawing Sheets

C3 is a
node (e.g., a processor and memory) that operates to look up
and read/write file data to a file hierarchy. The client acquires
the name of the file, looks up the file, and performs access
operations on the file. The operations desired are sent by the
client in the form of requests to a server over a network.

DISTRIBUTED, UNIFIED FILE SYSTEM OPERATIONS

BACKGROUND

In file storage systems, it is common to locate the files based on importance, where volumes are created on multiple storage systems and sometimes interconnected to form a file hierarchy. In some of these systems the files, or portions thereof, are replicated to increase availability.

In such hierarchies, many problems can arise. For example, adding new storage and/or processing capacity can entail the costly redesign of storage and data infrastructures. File virtualization is often limited to the volume level, or file-stubs are used and thus, seamless file-virtualization with varied granularity is not available. The use of distinct file servers and file meta-data servers often prevents direct connection by clients. Also, the use of direct mapping by meta-data servers does not lend itself to scalable operation. In short, the usual top-down designs do not provide a unified hierarchy that can be accessed in a consistent manner and cause churn to the storage infrastructure in a big way when the storage hiererchies have to be redesigned.

SUMMARY

In various embodiments, apparatus, systems, and methods that support distributed, unified file system operations are provided. In some cases, the operations include receiving a request to access a file from a client node at one of a plurality of lookup nodes, the lookup nodes storing portions of a distributed table having lookup information associated with the file. The distributed table, which may comprise a distributed hash table, includes replicated references to virtualized and non-virtualized file elements of varied granularity in a unified file system. Further activity may comprise forwarding the request to another one of the lookup nodes until the lookup information is located, or chaining the request to one of the plurality of lookup nodes and implementing activity that has been requested. Additional embodiments are described, and along with the foregoing examples, will be set forth in detail below.

DETAILED DESCRIPTION

To address some of the issues noted above, among others, distributed, unified file system operations can be implemented to provide a geographically distributed, scalable, available, and unified file hierarchy. This can be accomplished with a distributed, scalable, replicated file storage network that has file virtualization capabilities that aid in scaling or extending the file storage. This mode of operating in turn increases the availability of data, and reduces storage cost by placing data in appropriate classes of storage. These benefits accrue without the need for centralized knowledge of all the file data locations, or complete knowledge of all storage tiers and/or servers providing the data. In this way, a unified hierarchy can be assembled from a list of diverse, smaller hierarchies that are managed in a distributed manner.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Figure 1:
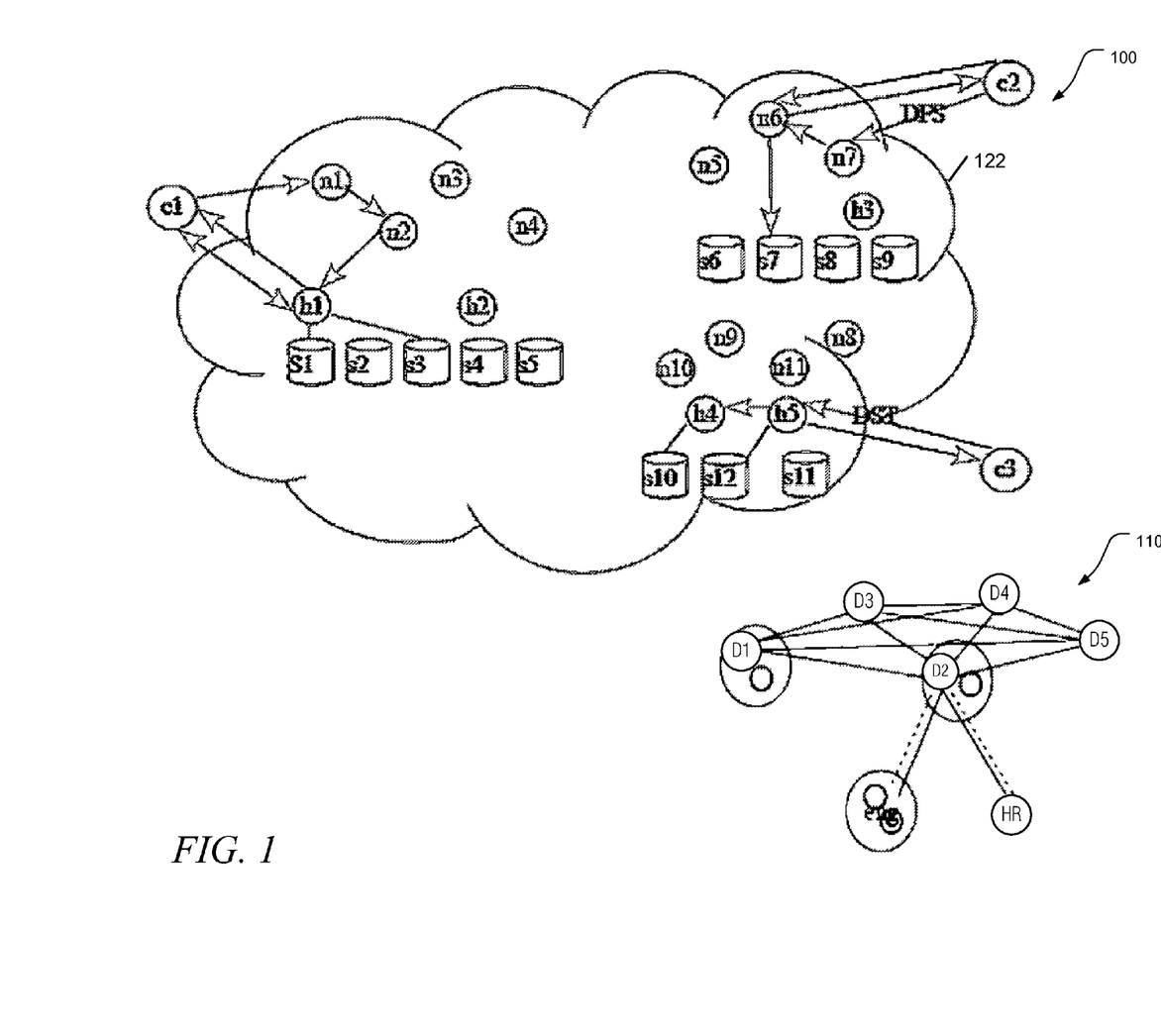
FIG. 1 is a block diagram that illustrates two groups of lookup nodes, each operating as a distributed, unified file system according to various embodiments of the invention.

FIG. 1 is a block diagram that illustrates two groups 100, 110 of lookup nodes, each operating as a distributed, unified file system according to various embodiments of the invention. To begin, consider four elements included in the illustrated system of group 100: clients (C1 ... C3), lookup nodes (N1 ... N11), servers (e.g., data servers H1 ... H5), and storage nodes (S1 ... S12).

Clients C1 ... C3 may communicate with selected parts of the group 100 and operate according to various file management techniques, perhaps using virtualized volumes, such as those provided by the Microsoft® Distributed File Service (DFS), or virtualized files, such as those provided by Novell® Dynamic Storage Technology (DST). The operations of the group 100 may occur within or as part of a cloud computing architecture 122, which includes resources that can be shared on demand, perhaps using the Internet or some other global computer network to access them.

For the purposes of this document a "client" C1 ... C3 is a node (e.g., a processor and memory) that operates to look up and read/write file data to a file hierarchy. The client acquires the name of the file, looks up the file, and performs access operations on the file. The operations desired are sent by the client in the form of requests to a server over a network.

"Lookup nodes" N1 ... N11, perhaps taking the form of file servers, operate to provide lookup services for file paths. Lookup nodes can also act as data servers for data which they can access directly. The entire file data space is partitioned into many areas, and the lookup services provided by a lookup node operate to route a lookup request to either (a) the target data server which can access the file, or (b) another lookup node, which may have the lookup information for the range of the file-space for which a lookup request is being processed. Lookup nodes can use distributed hash tables for storing the lookup information associated with relevant file path information. The lookup information stored on the lookup nodes can be replicated among more than one node, providing fault tolerance and high availability of the lookup information. The responsibility for lookup table management among the lookup nodes can also be partitioned to store lookup information for a portion, but not all, of the unified file hierarchy. In this way, lookup nodes can be added to and removed from the system with minimal churn in terms of the lookup information that is repartitioned or replicated, because the storage hierarchy itself operates using information that is distributed and replicated.

"Lookup information" is information describing the location (e.g., the identity of a server) of the particular path that is being sought. Lookup information is separate from the file system, and distributed among the lookup nodes. The lookup information can be stored in a lookup table, perhaps in the form of a hash table. The lookup information can either point to the actual node that provides the data, or to a lookup node that can be accessed to advance the lookup process. Lookup information is not necessarily stored as part of the file system itself; it is used to locate the end-point node servicing a file hierarchy that has the file element that is to be looked up.

A "reference" is information, perhaps taking the form of a pointer, that designates a file hierarchy stored in another part of the file system in such a way that seamless movement from one hierarchy to another is enabled. Thus, when a reference is encountered, it is understood by the node (e.g., file server) that the reference is to be followed (either by the node encountering the reference, or by the client requesting file access) to another hierarchy. The location of the other hierarchy can again be looked up using lookup nodes. The reference can be embedded in the file system hierarchy, whereas lookup information is not.

A "distributed hash table" (DHT) may comprise a fairly large hash table space divided up substantially evenly among a group of lookup nodes. For example, the lookup nodes N1 . . . N11 may each store approximately 9% of the entire DHT for the group 100, plus replicated portions of the table. Each of the lookup nodes can therefore provide lookup information for a requested object (in this case a file), or forward the corresponding lookup request to the next node which has better lookup information for the object. This process continues until the file is located, or the file is determined to be absent from the system.

Each lookup node can operate to locate an entry in the DHT as follows:
  The node generates a hash of a canonical form of the filename in question:
    the file name and path thus produces a key.
  The node looks up the key in its hash table.
  If the node locates the object (e.g., the file, by finding the key), it returns the lookup information for the file by using the key to locate the information.
  Otherwise the node (a) returns to the client a reference to another node which can further advance the lookup process, or (b) forwards the lookup message/request to another lookup node that can advance the process, and then returns the final result to the client. In this case, the key points to the node which can return the desired information, or the information itself, after being resolved using other nodes.

"Data servers" H1 . . . H5 are file servers which provide data operations on files that are (a) directly accessible (through the same data server), or (b) accessible through another data server or networked storage nodes S1 . . . S12 that can be chained and accessed by the same data server on behalf of the client. A data server can virtualize the location of data hierarchies over multiple storage volumes, as well as over one or more networks.

Data servers may use a virtualized file system having elements that internally point to other elements, such as external directories, volumes, and files in other volumes. Wherever a virtualized reference exists, those elements are represented by externally addressable identifiers (e.g., a uniform resource identifier (URI) for each such externally addressable element). These elements can range in size from volumes, to directories, to files, and thus the granularity of virtualization is flexible to allow for different types of data placement (e.g., as might be dictated by the use-case, as in DFS, Novell DST, etc.).

In many embodiments, a file server does not really know whether the reference it receives is a reference to a virtualized element, or a real element. The file server tries to use the protocol that is part of the reference to access the relevant node, along with the path included in the reference. If the file server fails to find the path as part of this attempt, it follows the reference path. In some embodiments, the format of the path, or the protocol of the request, can be used to indicate whether the request contains a reference to an actual file, or is merely a pointer to a virtual file element.

In some cases, multiple references may be provided to assist in locating data that is replicated for availability or disaster recovery purposes. The choice of using a particular reference among multiple available references can be based on a policy, including policies formulated to support high availability, load balancing, etc. For example, some policies that can be implemented to designate which one of several references should be chosen when multiple references to a file element exist within a system include "round-robin", "closest", and "default lookup".

The round-robin policy can be used where load-balancing clients that access the same files, or file hierarchies among multiple servers is desired. Here, the first client to request a file or hierarchy is redirected to the first reference, while the second client to request the file/hierarchy is directed to the second reference, and so on.

The closest policy makes use of location information associated with each of the references. Thus, the reference that is physically closest to the requesting client will be used.

The default lookup policy can be used when no path to the file element is found at the node currently processing the lookup request. In this case, one or more specific nodes within the system are previously designated as default nodes, and it is to these nodes that the request will be forwarded.

Virtualization may occur as part of a virtualized view file system, so as to be flexible in terms of the granularity and addressability of the file system elements. The actual file reference can thus exist as a symbolic link or as an extended attribute (xattr) in an otherwise empty file. Several examples, using various file management protocols, are listed below:
To refer to a volume which resides on another storage system:
  /a/b/c→scsi:/vol2/file1/file2 (DFS)
To refer to a volume that is accessible through another host with multiple references:

/a/b/d → cifs://host2/dir1 (DFS through a different access protocol)
/a/b/d → ncp://host3/dir1?referral (A hint to refrain from chaining, but to continue passing the referral)

To refer to a file which resides on another storage element:
  /a/b/c/d→/vol2/dir1/dir2/dir3 (DST local)
To refer to a file which is replicated and can be accessed through other hosts:

/a/b/c/e → ncp://host3/dir1/dir2/file3 (DST remote through NAS protocols)
/a/b/c/e → cifs://host4/dir1/dir2/file3 (multiple references for the same file)

To refer to a file that can be chained through the host server where the client made the request:
  /a/b/c/f→cifs://host4/dir1/dir2/file4:?chain
Once the lookup operation is complete, the access to data may be provided as follows:
The client (or another data server) sends the operation request (e.g., read or write), along with the file path, to the appropriate data server host.
If the file referenced by the path comprises a direct data element accessible from its host (e.g., a data server), then the host performs the operation directly.
If the host finds that this element is virtualized (e.g., takes the form of a virtualized file or directory), then the host points to a file that is not accessible from this host. Thus, the host either (a) redirects the client to another host or storage which can process the request, or (b) performs the remote operation by sending it to the correct host or storage where the operation can be performed.

Files may have meta-data information that is incorporated into the lookup process—these can be accessed from (a) the data servers, (b) the lookup servers, and (c) a special category of meta-data servers, which are specialized data or lookup servers capable of caching the meta-data of files.

Externally addressable identifiers can also be used to encapsulate a protocol for accessing the requested file when the backend storage forming part of the groups 100, 110 comprises a storage filer and/or network-attached storage (NAS).

"Storage nodes" S1 . . . S12 refer to a storage element, such as DAS (direct-attached storage), NAS, or SAN (storage area network) that actually stores the data for the referenced file. Storage can offer access to data in a variety of formats, including blocks (e.g., using SCSI (small computer system interface)) and/or networked files (e.g., using NAS), among others. Storage can also be provided using a cloud architecture 122 that is served through block or file protocols. The use of partitioning within a unified logical file hierarchy will now be described.

When file operations are requested by clients, a DHT can be used to limit the amount of lookup node activity with respect to an entire file hierarchy, such as within the system group 100. Thus, even though the overall hierarchy may be quite large, the involvement of an individual lookup node may be limited to only a portion of the hierarchy. This can be achieved by partitioning to create a hierarchy of the lookup nodes, perhaps arranged as a tree.

For example, one might assume the need to support a problem space of one million independently-addressable file hierarchies (which provide access to many more than a million files, via relocation, replication, and lookup operations, among others). If a client requests a file operation that involves looking up a file referenced by the path cifs:/host1/a/b/c/d/e/f, for example, various embodiments can continue to operate even when the directory f is not addressable, or when there is no separate lookup entry, as long as one of the parent paths of the referenced path have lookup entries that result in forwarding the request to a host or storage that can directly access directory f.

In this example, the problem space of one million independent file hierarchies is divided so that each hierarchy can be used for lookup operations. If one assumes that ten servers are used as lookup nodes, and no replication is used to enhance availability, the problem space can be divided into approximately 100,000 hash spaces for each server. To allow deletions of lookup nodes, the problem space can be striped with approximately 120,000 hash spaces per server to provide a 20% lookup overlap between servers in the group. If the group is managed in this fashion, any one server can be removed from the group without a loss of lookup information availability.

Additions of lookup nodes to the group are also easily handled. Thus, to add a new lookup node, the range of the problem space can be further divided to provide an additional portion of the space, and a representative portion of the table can be distributed to the new node, so that existing nodes may service that portion of the range as well.

Group 110 illustrates an example of partitioning lookup nodes within a group based on the part of the hierarchy tree they represent. Here one can assume there are five independent hierarchies: d1 . . . d5, representing /data1, . . . , /data5. In this case, sub-hierarchies exist under /data2, as /data2/eng and /data2/hr.

In an embodiment, the problem space can be divided into separate hierarchies d1, d2, d3, d4, d5, eng, hr, and assigned to corresponding lookup nodes N1 . . . N7 (e.g., see nodes N1 . . . N7 in group 100). Then nodes N1 . . . N5 will have lookup information to reach the hierarchies eng and hr, by passing this information on to nodes N6 and N7, respectively. Similarly, when a lookup operation is underway for an element reference that is greater in scope than what is available at a particular lookup node, the request can be redirected to the parent node in the tree. In some embodiments, due to the presence of replication, the distribution of lookup table information might actually be made among a greater number of nodes (e.g., nodes N1 . . . N10), instead of limiting the distribution to node N1 . . . N7, to accommodate a desired amount of overlap. Thus, many embodiments may be realized.

For example, assume that a client C attempts to access a file /a/b/c/ within a system, according to various embodiments. This client C might use the CIFS (Common Internet File System) protocol, communicating first with lookup server node A. Assume that server A hosts /a/b, and has a reference for /c, which is hosted by lookup server node B.

In this case the server nodes have the lookup information partitioned in such a way that each server has lookup information for the directories at the highest level. Thus, when client C transmits the request to server A via CIFS to open the file via cifs://share/a/b/c, server A does not have lookup information for /c, so server A first tries to look up /a/b, and then tries to look up /a. In doing so, server A determines that it has the lookup information for the higher level directory /a, which points to server B.

Server A might then transmit a directory listing of cifs://share/a/b/c to server B, such that server A chains the request to server B. It is also possible, in some embodiments, for server A to simply direct the client C to server B.

Thereafter, server B determines that it has the lookup information for cifs://share/a/b/c, and sends the directory listing for /a/b/c to server A. Server A, in turn, is configured to chain the request from client C. Thus, server A reads the file meta-data information provided by server B using any convenient protocol. Finally, the client C receives the file handle from server A.

Thus, in many embodiments, when the generated hash key is found in the DHT for a particular lookup node, this means that the entire file sought by the client has been located. If the key is not found to be present, then the file server can use a subset of the path for repetitively generating subsequent keys to move through the hierarchy, from lower levels to higher levels, up to the highest portion of the path information. Along the way, a determination is made as to whether the current lookup node, or some other node has the information to access the hierarchy in which the file is stored. Thus, a key is generated for each subset of the complete file path, until some part of the path is located within the system. If no key is found, a default policy can be used to redirect the lookup operation. Thus, many additional embodiments may be realized.

Figure 2:
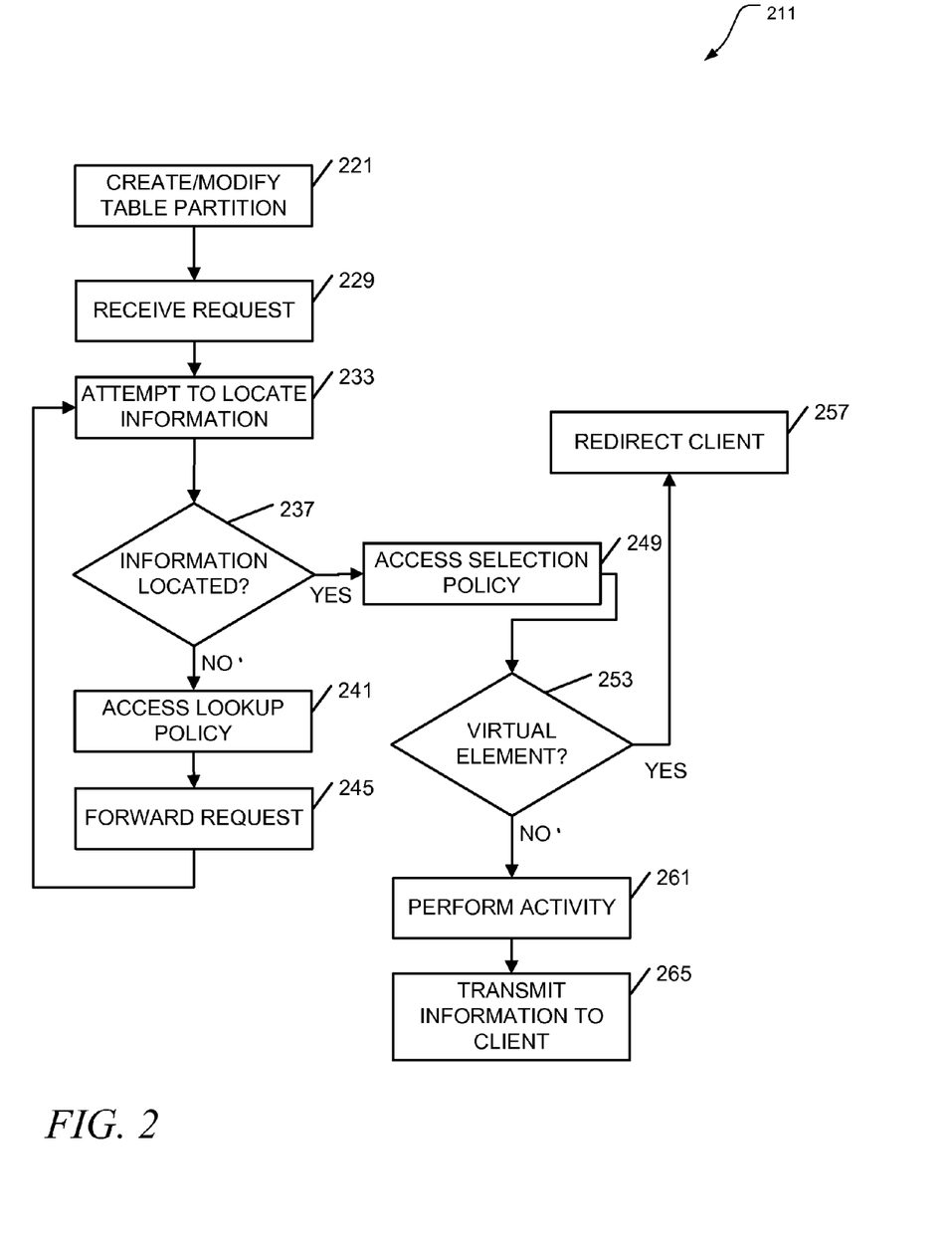
FIG. 2 is a flow diagram illustrating methods of operation according to various embodiments of the invention.

For example, FIG. 2 is a flow diagram illustrating methods 211 of operation according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when executed by a specific machine, operate to perform the processing depicted in FIG. 2.

Some embodiments include transmitting a request to access one of many distributed files in a unified file system. Once the request is received at a lookup node within the system, the request is forwarded to other lookup nodes until the file lookup information is located (and then returned to the client), or the request is chained and executed by one of the lookup nodes.

Thus, a method 211 may begin at block 221 with creating and/or modifying the partition for a lookup table, to provide a distributed table having lookup information for files within a distributed, unified file system. The look up table may comprise a hash table.

The file system can be partitioned so that portions of the table are stored across multiple lookup nodes. A portion stored on any one lookup node may be overlapped by the portion that is stored on one or more other lookup nodes. Thus, the activity at block 221 may comprise partitioning a hash table among a plurality of lookup nodes so that some entries in the hash table in some (and possibly all) of the lookup nodes overlap entries in the hash table in at least one of the other lookup nodes.

The file system may have a single logical namespace to virtualize distributed volumes. Thus, the unified file system may comprise a unified single logical namespace to virtualize distributed volumes and/or individual file locations. The unified file system may comprise a non-transitory file storage system.

Lookup nodes can be added to the file system by distributing part of the table stored on the added node to one of the other lookup nodes in the system. Thus, the activity at block 221 may comprise adding an additional lookup node to a plurality of lookup nodes by selecting a portion of the table included in the additional lookup node and distributing the portion to at least another one of the lookup nodes.

The method 211 may continue on to block 229 with receiving a request to access a file from a client node at one of a plurality of lookup nodes. As noted previously, the lookup nodes can be used to store portions of a distributed table having lookup information associated with the file. The distributed table may include replicated references to both virtualized and non-virtualized file elements of varied granularity in a unified file system.

Virtualized file element references in the table may comprise symbolic links or extended attributes, among others. Extended attributes may contain a fully addressable link to the actual location of the file—along with the access protocol, the host identity, and the path of the file, if desired. Therefore, replicated references to virtualized file elements may comprise a symbolic link or an extended attribute.

References in the table may be formatted according to a variety of different file or block access protocols, such as CIFS, NFS, etc. The protocol may be specified as part of an extended attribute. Therefore, a first subset of the replicated references may be formatted according to a first protocol, and a second subset of the replicated references may be formatted according to a second protocol (which is different from the first protocol).

The method 211 may continue on to block 233, with attempting to locate the lookup information within the system. In some embodiments, the lookup information can be located by matching keys in a hash table. Thus, the activity at block 233 may comprise locating the lookup information by matching a key in the hash table to a hash of a name associated with the file. The method 211 may continue from block 233 to block 237.

If the lookup information is not found, as determined at block 237, then the method 211 may continue on to block 241, with accessing the lookup policy. As noted previously policies can be established to direct the sequence in which the lookup nodes forward the request. Thus, the activity at block 241 may comprise accessing a policy to determine the next lookup node to which the request will be forwarded.

References in the table may point to the location of the file lookup information, or to the location of another lookup node that may have the file lookup information. Thus, a reference in the table may comprise the location of the lookup information, or the location of a subsequent one of the lookup nodes.

The method 211 may continue on to block 245, with forwarding the request to another one of the lookup nodes until the lookup information is located (or chaining the request to one of the plurality of lookup nodes and implementing activity that has been requested).

If the lookup information is found, as determined at block 237, then the method 211 may continue on to block 249. As noted previously, policies can be used to direct selection and use of a single file reference from multiple, replicated versions of the reference. Therefore, the activity at block 249 may comprise selecting one reference from several replicated references based on a policy.

When the element to be accessed comprises a virtualized element, the client may be redirected from one server node to another. Thus, the method 211 may continue on to block 253, to include determining that the element referenced in the request is a virtualized element. In this case, the method 211 may comprise, at block 257, redirecting the client node to a second server node in the file system when the first server node, referenced by the lookup information, determines that the lookup information refers to a virtualized file element.

A lookup node can act directly on the file it stores, in accordance with the request it has received, instead of returning the lookup information to the client. Thus, after the lookup information is located, if it is determined at block 253 that the element referenced in the request is not a virtualized element, then the method 211 may continue on to block 261 with performing activity associated with the request, on the file, by one of the lookup nodes—when it is determined that the file comprises a data element directly accessible by that lookup node.

Once the lookup information is located, it can be sent to the client. Thus, the method 211 may comprise, at block 265, transmitting the lookup information to the client node, wherein the lookup information permits the client node to access the file.

The methods described herein do not have to be executed in the order described, or in any particular order. Moreover, various activities described with respect to the methods identified herein can be executed in repetitive, serial, or parallel fashion. The individual activities illustrated using FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The activities shown in FIGS. 1 and 2 can be implemented in various devices, as well as in a computer-readable storage medium, where the methods are adapted to be executed by one or more processors. Further details of such embodiments will now be described.

Figure 3:
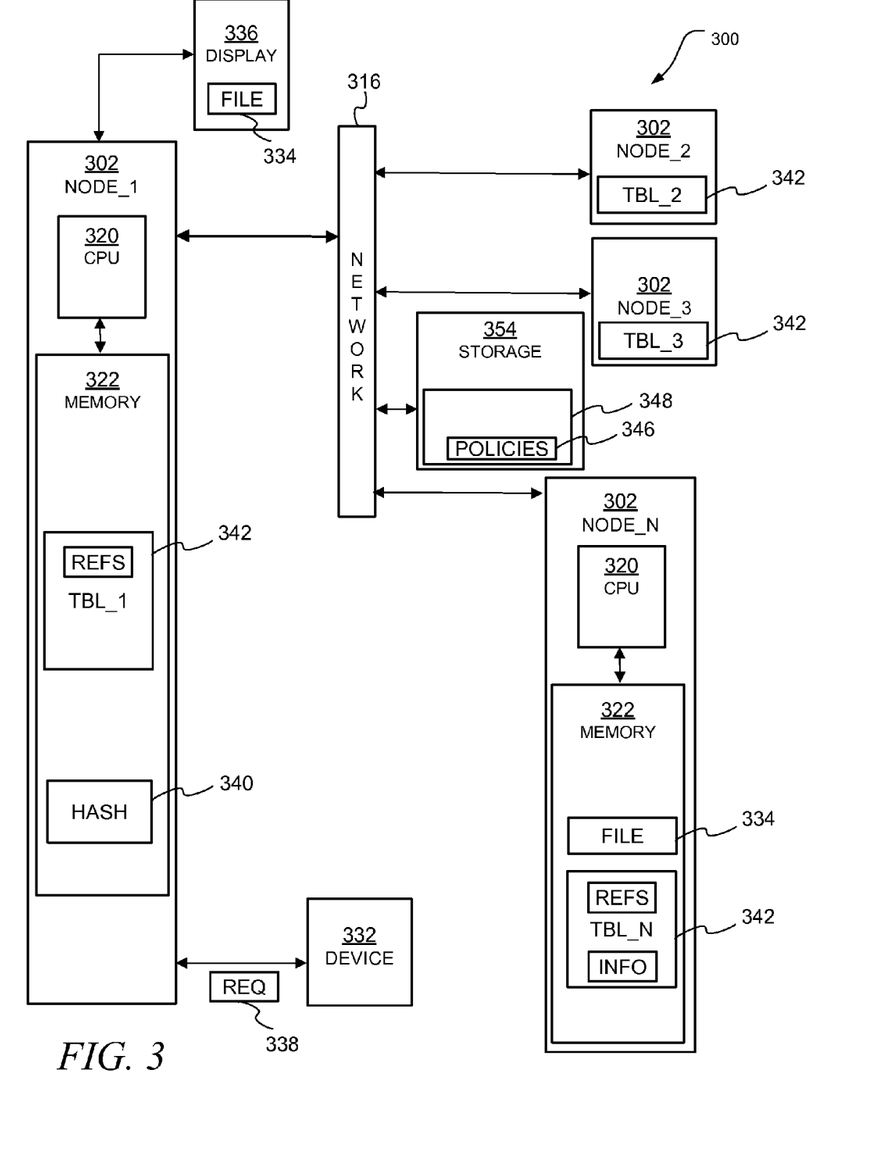
FIG. 3 is a block diagram of apparatus and systems according to various embodiments of the invention.

FIG. 3 is a block diagram of apparatus 300 and systems according to various embodiments of the invention. Here it can be seen that an apparatus 300 used to provide distributed, unified file system operations may comprise one or more processing nodes 302, one or more processors 320, multiple memories 322, and/or displays 336. The apparatus 300 may comprise a client, a server, or some other networked processing node.

The processing nodes 302 may comprise physical machines or virtual machines, or a mixture of both. The nodes 302 may also comprise networked entities, such as servers and/or clients. In some basic implementations, the operations described can occur entirely within a single node 302. The apparatus 300 may thus comprise a single desktop computer or server, for example, or a number of networked nodes 302.

In some embodiments, then, an apparatus 300 may comprise a plurality of nodes 302, such as lookup nodes, to store portions of a distributed table 342 having lookup information INFO associated with a file 334. The distributed table 342 includes replicated references REFS to virtualized and non-virtualized file elements of varied granularity in a unified file system. The nodes 302 may comprise a combination of file servers and meta-data servers.

The apparatus 300 may further include one or more processors 320 within one or more of the lookup nodes 302 to receive a request 338 from a client node 332 to access the file 334. The lookup nodes 302 may operate to forward the request 338 to other lookup nodes 302 until the lookup information is located, or to chain the request 338 to one of the plurality of lookup nodes 302 so that activity that has been requested can be directly implemented.

The request may originate from a user input device (e.g., a tablet computer, a workstation, a cellular telephone, etc.) that operates as a client node. Thus, the apparatus 300 may comprise a user input device operating as the client node 332.

The client node may occupy the same physical machine as one of the lookup nodes. Thus, the apparatus 300 may be configured so that the client node 332 is housed together with at least one of the lookup nodes 302.

Policies that direct the sequence of lookup operations may be stored in a memory. The memory 348 may be housed in a storage device 354, including a storage node. Thus, the apparatus 300 may comprise one or more memories 348 to store policies 346 that define and direct a lookup path through the lookup nodes 302 when the lookup information INFO is not located within the one of the lookup nodes 302.

A hashing module may be used to generate keys as part of lookup operations. Thus, the apparatus 300 may comprise a hashing module 340 to generate a hash of a filename associated with the file 334, or a path in a hierarchy associated with the file 334.

The processing elements and the storage device may be constructed as a single unit, or separately. Thus, in some embodiments, the processors 320 may be housed together with the storage device 354. The storage device 354 may comprise volatile memory, non-volatile memory, or a combination of the two.

A system that operates to manage file access may comprise multiple instances of the apparatus 300. The system might also comprise a cluster of nodes 302, including physical and virtual nodes. It should be noted that any of the nodes 302 may include any one or more of the elements explicitly shown in nodes NODE_1, NODE_2, NODE_3, . . . , NODE_N, in any combination.

The nodes 302 may exist as a device embedded within another structure (e.g., as an embedded device), or as a regular desktop or laptop computer that includes a display 336 to show the activities conducted while nodes 302 are active. Thus, the apparatus 300 may also comprise a display 336 coupled to the nodes 302 to display visible indications of the activities conducted (e.g., accepting entry of the request 338) by the nodes 302.

The apparatus 300 and system may be implemented in a machine-accessible and readable medium that is operational over one or more networks 316. The networks 316 may be wired, wireless, or a combination of wired and wireless. The apparatus 300 and system can be used to implement, among other things, the processing associated with the activities illustrated in FIGS. 1 and 2, respectively. Modules may comprise hardware, software, and firmware, or any combination of these. Additional embodiments may be realized.

Figure 4:
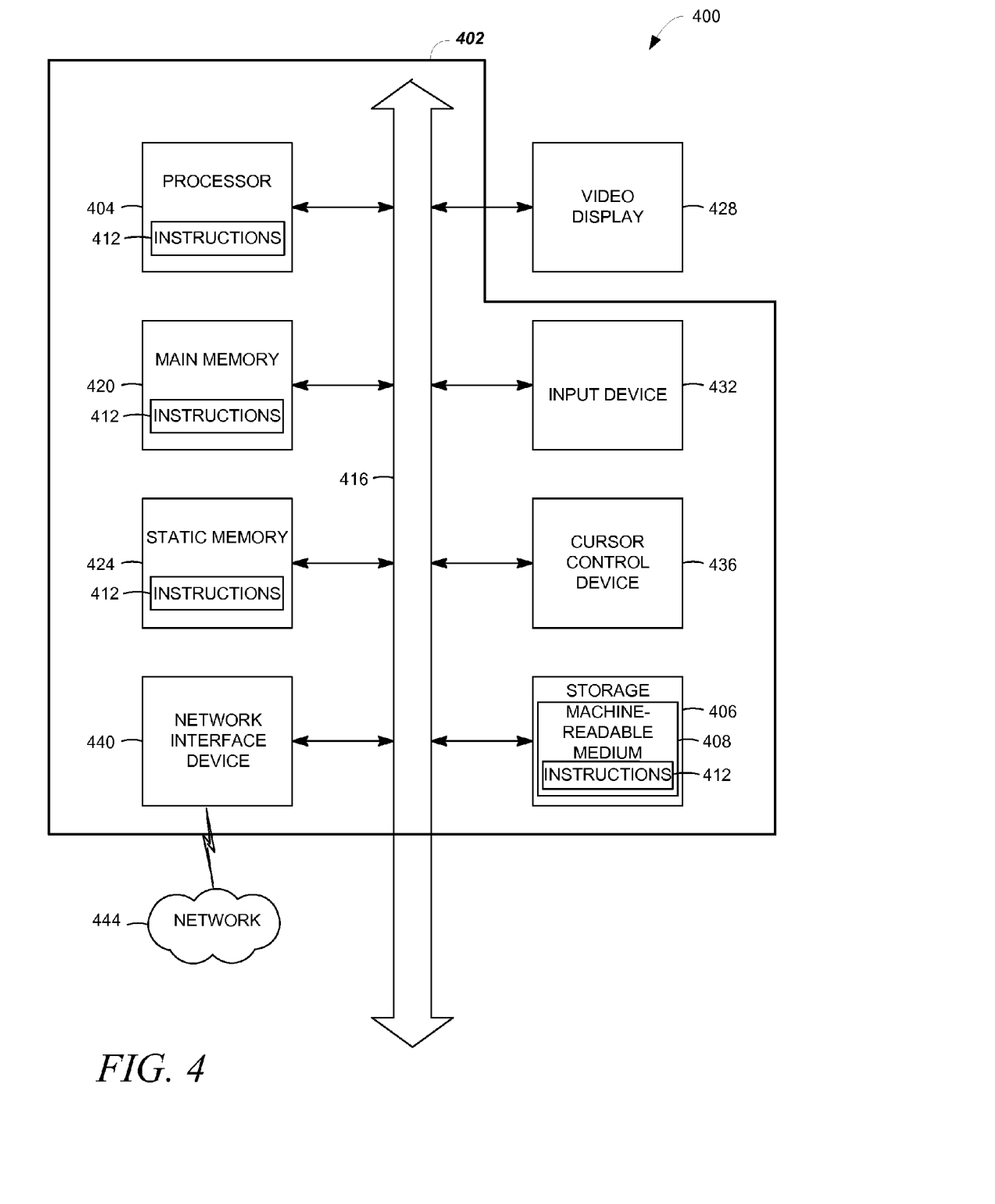
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any tangible, non-transitory memory including an electrical, optical, or electromagnetic conductor) having instructions 412 stored thereon (e.g., computer program instructions), which when executed by the one or more processors 404 result in the machine 402 performing any of the actions described with respect to the methods outlined above.

The machine 402 may take the form of a specific computer system having a processor 404 coupled to a number of components directly, and/or using a bus 416. Thus, the machine 402 may be similar to or identical to the apparatus 300 or system shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the various embodiments, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing access to files. For example, various embodiments may operate to unify all the file data available in an organization (and even outside of it) into a single, unified, scalable hierarchy. File data may be virtualized so that data of any desired granularity can be moved into the most appropriate storage locations, without affecting addressability by clients, and without manual operations from administrators, including load balancing operations related to simultaneous data access. More efficient utilization of client applications, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   a data server to perform operations on a file of a unified file system;
   a distributed table having lookup information for the file, the distributed table supporting the unified file system, the lookup information being separate from the unified file system, the lookup information describing the location of the data server;
   a plurality of lookup nodes to store portions of the distributed table, no single portion being an entirety of the distributed table, and the portions being are distributed evenly among the plurality of lookup nodes,
   a lookup node in the plurality of lookup nodes, the lookup node comprising:
      a memory to store policies that direct a lookup path through the plurality of lookup nodes; and
      a processor to;
         receive a request from a client node to access the file, the request including the file name and a path of the file;
         generate a key for the file by hashing the file name and the path of the file received in the request;
         determine that the lookup information for the file is not stored on the lookup node by looking up the key the portion of the distributed table resident on the lookup node; and
         forward the request to another one of the plurality of lookup nodes according to the policies stored in the memory to chain the request to the plurality of lookup nodes to find a second lookup node, from the plurality of lookup nodes, with the lookup information so that the access that has been requested can be directly implemented by the data server.

2. The apparatus of claim 1, further comprising:
   a user input device operating as the client node.

3. The apparatus of claim 1, wherein the lookup nodes comprise a combination of file servers and file meta-data servers.

4. The apparatus of claim 1, wherein the client node is housed together with at least one of the lookup nodes.

5. A processor-implemented method to execute on one or more processors that perform the method, comprising:
   receiving, at a lookup node from a plurality of lookup nodes, a request to access a file of a unified file system from a client node, the request including a file name and a path of the file, the lookup nodes storing portions of a distributed table, the distributed table having lookup information for the file, wherein the distributed table includes replicated references to virtualized and non-virtualized file elements of varied granularity in a unified file system, no single portion of the distributed table is an entirety of the distributed table, the portions of the distributed table being distributed evenly among the plurality of lookup nodes, the lookup information being separate from the unified file system and describing the location of a data server that can perform operations on the file;

generate, by the lookup node, a key for the file by hashing the file name and the path of the file;

determining, by the lookup node, that the lookup information for the file is not stored on the lookup node by looking up the key in a portion of the distributed table resident on the lookup node;

accessing, by the lookup node, a policy to determine a second lookup node from the plurality of lookup nodes to which the request will be forwarded; and forwarding, by the lookup node, the request to the second lookup node to chain the request to the plurality of lookup nodes to find the lookup information and implement, by the data server, the access that has been requested.

6. The method of claim 5, further comprising:
transmitting the lookup information to the client node, wherein the lookup information permits the client node to access the file via the data server.

7. The method of claim 5, wherein a reference in the table comprises a location of the lookup information, or a location of a subsequent one of the lookup nodes.

8. The method of claim 5, further comprising:
redirecting the client node to a second data server when the data server, referenced by the lookup information, determines that the lookup information refers to one of the virtualized file elements.

9. The method of claim 5, wherein at least one of the replicated references to one of the virtualized file elements comprises one of a symbolic link or an extended attribute.

10. The method of claim 5, wherein a first subset of the replicated references are formatted according to a first protocol, and wherein a second subset of the replicated references are formatted according to a second protocol different from the first protocol.

11. The method of claim 5, wherein the unified file system comprises a unified single logical namespace to virtualize distributed volumes and/or individual file locations.

12. The method of claim 5, further comprising:
partitioning the table among the plurality of lookup nodes so that some entries in the table in each one of the lookup nodes overlap entries in the table in at least one of the other lookup nodes.

13. The method of claim 5, further comprising:
adding an additional lookup node to the plurality of lookup nodes by selecting a portion of the table included in the additional lookup node and distributing the portion to at least one other one of the lookup nodes.

14. At least one non-transitory machine readable medium including instructions that, when executed by a machine, cause the machine to perform operations comprising:

receiving, at a lookup node from a plurality of lookup nodes, a request to access a file of a unified file system from a client node, the request including a file name and a path of the file, the lookup nodes storing portions of a distributed table, the distributed table having lookup information for the file, wherein the distributed table includes replicated references to virtualized and non-virtualized file elements of varied granularity in a unified file system, no single portion of the distributed table is an entirety of the distributed table, the portions of the distributed table being distributed evenly among the plurality of lookup nodes, the lookup information being separate from the unified file system and describing the location of a data server that can perform operations on the file;

generate, by the lookup node, a key for the file by hashing the file name and the path of the file;

determining, by the lookup node, that the lookup information for the file is not stored on the lookup node by looking up the key in a portion of the distributed table resident on the lookup node;

accessing, by the lookup node, a policy to determine a second lookup node from the plurality of lookup nodes to which the request will be forwarded; and forwarding, by the lookup node, the request to the second lookup node to chain the request to the plurality of lookup nodes to find the lookup information and implement, by the data server, the access that has been requested.

15. The medium of claim 14, wherein the operations further comprise: transmitting the lookup information to the client node, wherein the lookup information permits the client node to access the file via the data server.

16. The medium of claim 14, wherein a reference in the table comprises a location of the lookup information, or a location of a subsequent one of the lookup nodes.

17. The medium of claim 14, wherein the operations further comprise: redirecting the client node to a second data server when the data server, referenced by the lookup information, determines that the lookup information refers to one of the virtualized file elements.

18. The medium of claim 14, wherein a first subset of the replicated references are formatted according to a first protocol, and wherein a second subset of the replicated references are formatted according to a second protocol different from the first protocol.

19. The medium of claim 14, wherein the operations further comprise: partitioning the table among the plurality of lookup nodes so that some entries in the table in each one of the lookup nodes overlap entries in the table in at least one of the other lookup nodes.

* * * * *

UNITED STATES PATENT AND TRADEMARK OFFICE
CERTIFICATE OF CORRECTION

| | |
|---|---|
| PATENT NO. | : 9,037,618 B2 |
| APPLICATION NO. | : 13/077248 |
| DATED | : May 19, 2015 |
| INVENTOR(S) | : Srinivasaraghavan et al. |

It is certified that error appears in the above-identified patent and that said Letters Patent is hereby corrected as shown below:

In the Claims

In column 12, line 36, in Claim 1, delete "to;" and insert --to:--, therefor

Signed and Sealed this
Twentieth Day of October, 2015

Michelle K. Lee
*Director of the United States Patent and Trademark Office*